United States Patent
Astrike

(10) Patent No.: US 9,956,996 B2
(45) Date of Patent: May 1, 2018

(54) CARGO BED EXTENSION ASSEMBLY INCLUDING COVER FOR A TAILGATE

(71) Applicant: Toyota Motor Engineering & Manufacturing North America, Inc., Erlanger, KY (US)

(72) Inventor: Logan R. Astrike, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days. days.

(21) Appl. No.: 15/203,559

(22) Filed: Jul. 6, 2016

(65) Prior Publication Data

US 2018/0009487 A1  Jan. 11, 2018

(51) Int. Cl.
*B62D 33/027* (2006.01)
*B62D 33/04* (2006.01)
*B60P 7/02* (2006.01)
*B62D 33/03* (2006.01)

(52) U.S. Cl.
CPC .............. *B62D 33/046* (2013.01); *B60P 7/02* (2013.01); *B62D 33/0273* (2013.01); *B62D 33/03* (2013.01)

(58) Field of Classification Search
CPC .. B62D 33/046; B62D 33/03; B62D 33/0273; B60P 7/02
USPC ................................. 296/26.1, 50
See application file for complete search history.

(56) References Cited

U.S. PATENT DOCUMENTS

| | | | |
|---|---|---|---|
| 4,472,639 A | 9/1984 | Bianchi | |
| 5,468,038 A | 11/1995 | Sauri | |
| 6,367,858 B1 | 4/2002 | Bradford | |
| 7,513,552 B2 * | 4/2009 | Carvalho | B60P 1/431 296/26.09 |
| 7,628,439 B1 * | 12/2009 | Strong | B62D 33/0273 108/44 |
| 7,874,610 B2 * | 1/2011 | Khalighi | B62D 33/0273 296/180.1 |
| 9,150,259 B2 * | 10/2015 | Jutila | B62D 33/0273 |
| 9,452,793 B1 * | 9/2016 | Quick | B62D 33/0273 |
| 9,481,316 B2 * | 11/2016 | Faruque | B60R 9/06 |
| 9,809,142 B1 * | 11/2017 | White | B60P 1/6409 |
| 2010/0140973 A1 * | 6/2010 | Duncan | B60J 7/141 296/100.09 |
| 2015/0225024 A1 * | 8/2015 | Newberry | B62D 33/0273 296/26.11 |
| 2016/0200373 A1 * | 7/2016 | Waskie | B60P 3/40 296/26.11 |

(Continued)

*Primary Examiner* — Pinel E Romain
(74) *Attorney, Agent, or Firm* — Christopher G. Darrow; Darrow Mustafa PC

(57) ABSTRACT

A cargo bed extension assembly includes a tailgate structured to be movable between a raised configuration and a lowered configuration. The tailgate includes a cavity formed therein. An extension mechanism is positioned within in the cavity. The extension mechanism includes an extension member coupled to the tailgate so as to be movable between a stowed configuration and an extended configuration, and so as to enable rotation of the extension member from the extended configuration to a raised configuration. The mechanism also includes a cover portion coupled to the extension member so as to be movable between a stowed configuration and a deployed configuration in which the cover portion covers at least a portion of the bed.

21 Claims, 12 Drawing Sheets

(56) References Cited

U.S. PATENT DOCUMENTS

2017/0101138 A1* 4/2017 Povinelli .............. B62D 35/007
2017/0203799 A1* 7/2017 Quick ................ B62D 33/0273
2017/0282979 A1* 10/2017 Singer ................ B62D 33/0273

* cited by examiner

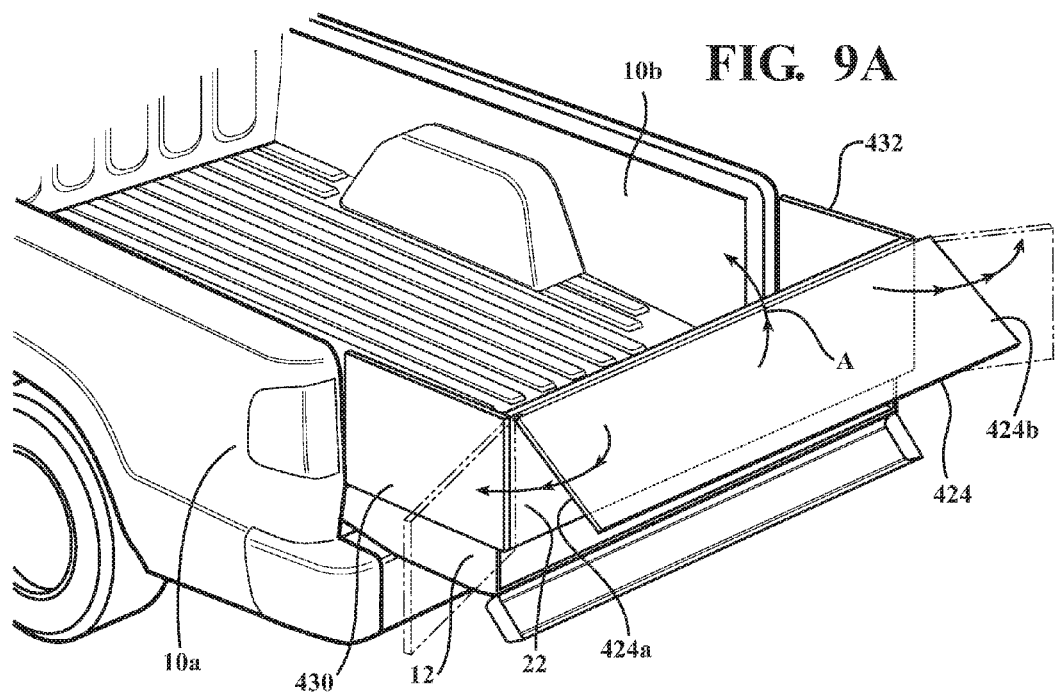
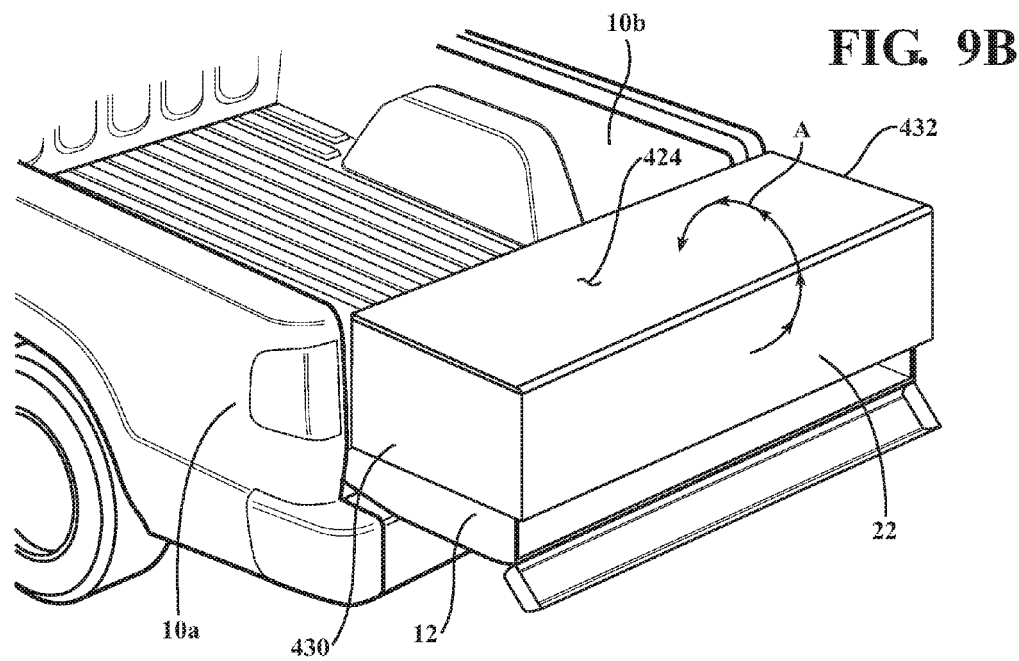

CARGO BED EXTENSION ASSEMBLY INCLUDING COVER FOR A TAILGATE

TECHNICAL FIELD

The embodiments described herein relate to mechanisms for extending the effective cargo bed length of a pickup truck.

BACKGROUND

Pickup trucks may be used to transport various types of cargo. These trucks generally have a flat bed or floor near the rear of the vehicle, into which the cargo can be loaded. A rear door or tailgate provides access to the bed and may be opened and closed for loading. In the closed or raised condition, the tailgate keeps cargo from rolling or falling out of the bed. The trucks may be designed so that, when the tailgate is folded down for cargo loading, an interior surface of the tailgate is level with the bed floor.

Certain types of cargo may occupy more floor space than may be available in a standard cargo bed. For such situations, certain devices have been designed to allow a lowered tailgate to serve as an extension of the bed. These devices allow loaded cargo to extend past the end of the standard bed and to occupy a portion of the folded-down tailgate interior surface when the tailgate is down, while preventing the cargo from falling out of the bed. However, when the cargo bed is extended, a bed cover (such as a tonneau cover) structured to cover the normal-sized bed will generally not be able to cover the extended portion of the bed.

SUMMARY

In one aspect of the embodiments described herein, a cargo bed extension assembly includes a tailgate structured to be movable between a raised configuration and a lowered configuration. The tailgate includes a cavity formed therein. An extension mechanism is positioned within in the cavity. The extension mechanism includes an extension member coupled to the tailgate so as to be movable between a stowed configuration and an extended configuration, and so as to enable rotation of the extension member from the extended configuration to a raised configuration. The mechanism also includes a cover portion coupled to the extension member so as to be movable between a stowed configuration and a deployed configuration in which the cover portion covers at least a portion of a cargo bed.

In another aspect of the embodiments described herein, a tailgate for a pickup truck is provided. The tailgate includes a cavity formed therein, and a cover portion positioned within the cavity and structured to be movable between a stowed configuration inside the cavity, and a deployed configuration in which the cover portion covers at least a portion of a bed of the pickup truck.

In another aspect of the embodiments described herein, a bed extension mechanism for a vehicle tailgate is provided. The mechanism includes an extension member structured for coupling to a vehicle tailgate so as to be movable to a raised configuration when the tailgate is in a lowered configuration. The mechanism also includes a cover portion coupled to the extension member and structured to be movable between a stowed configuration and a deployed configuration in which the cover portion covers the tailgate when the tailgate is in the lowered configuration and the extension member is in the raised configuration.

BRIEF DESCRIPTION OF THE DRAWINGS

FIGS. 9A and 9B are perspective views of a cargo bed extension assembly embodiment in which cargo bed extension assembly side panels are stowed between an extension member and a cover portion.

DETAILED DESCRIPTION

The disclosure relates to a cargo bed extension assembly usable in a pickup truck, for example. The assembly includes a tailgate movable between a raised configuration and a lowered configuration. The tailgate includes a cavity formed therein. A cargo bed extension mechanism is positioned within in the cavity. Deployment of the extension mechanism closes a rear portion of an extended cargo bed when the tailgate is left down and used as a portion of the bed. The mechanism also has a cover portion which is positionable to cover at least the extended portion of the bed.

Figure 1:
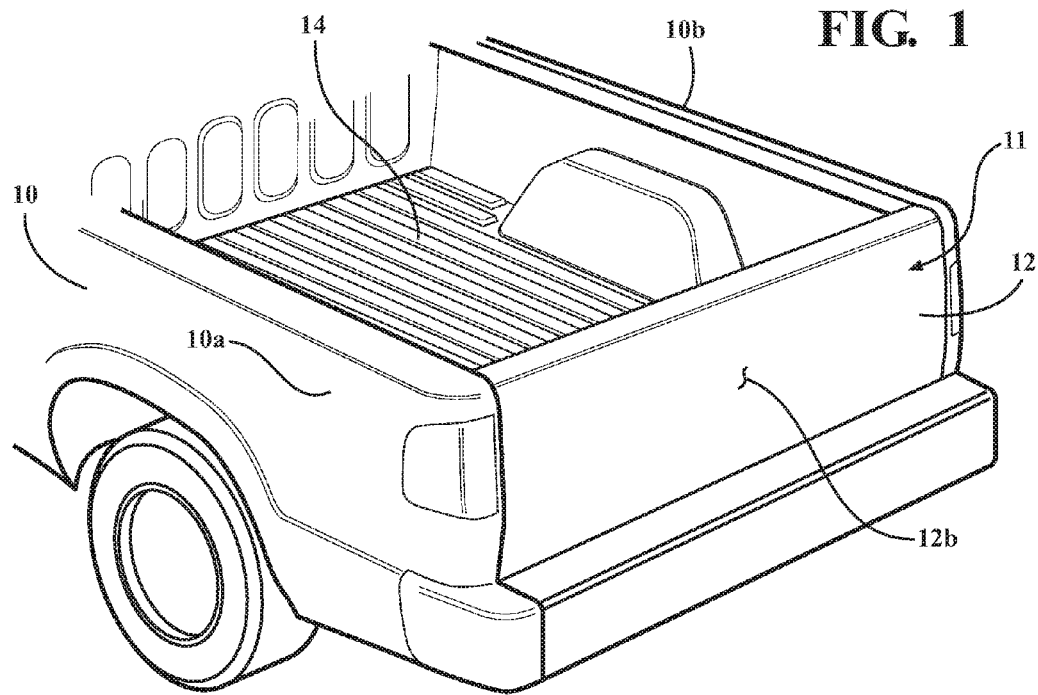
FIG. 1 is a perspective view of a rear portion of a vehicle incorporating a cargo bed extension assembly in accordance with an embodiment described herein.
Figure 2:
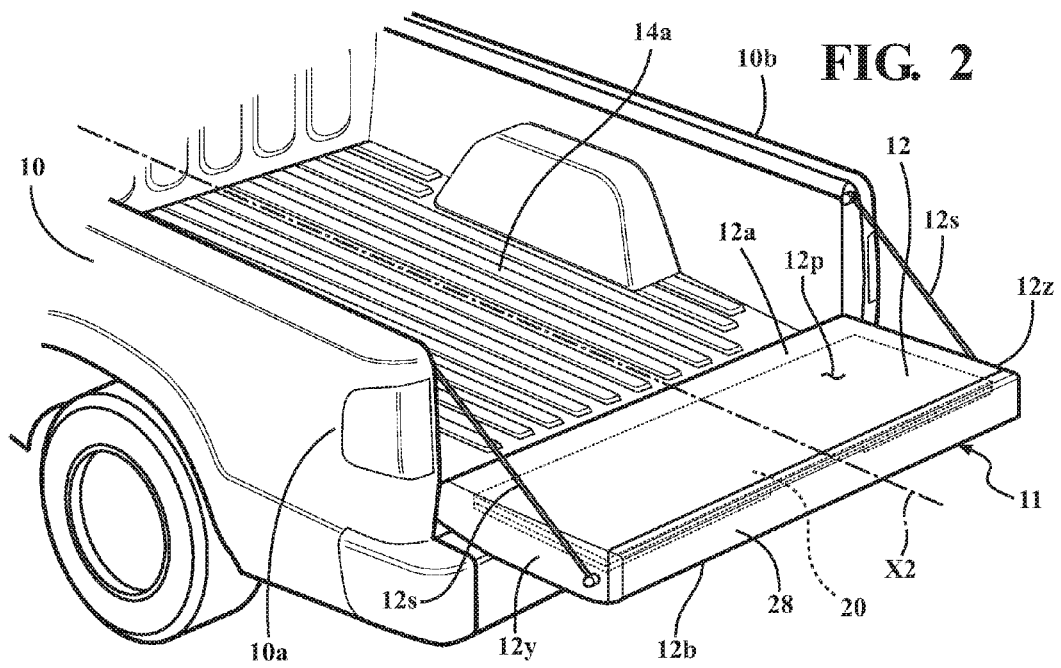
FIG. 2 is the perspective view of FIG. 1 showing a tailgate of the cargo bed extension assembly in a down or lowered configuration.

FIGS. 1 and 2 are perspective views of a rear portion of a vehicle 10 incorporating a cargo bed extension assembly 11 in accordance with an embodiment described herein. In embodiment shown in FIG. 1, vehicle 10 is in the form of a pickup truck and includes a tailgate 12 of the cargo bed extension assembly providing access to the bed 14 (such as the cargo bed) of the pickup truck. Tailgate 12 is rotatably attached to the body or frame of the vehicle 10 so as to be movable between multiple angular orientations relative to the truck body or frame. For example, the tailgate 12 may be movable between a raised configuration (shown in FIG. 1) in which the tailgate is latched to the body of the vehicle 10 to close the bed 14, and a lowered configuration (shown in FIG. 2) in which the tailgate 12 has been unlatched and dropped approximately 90 degrees to provide better access to the truck bed for loading and unloading.

Referring to FIGS. 1-2, the tailgate 12 may include an inner wall 12a and an outer wall 12b opposite the inner wall and coupled to the inner wall. Inner wall 12a faces toward an interior of the bed 14 when the tailgate is raised, and outer wall 12b faces outwardly, toward an exterior of the vehicle when the tailgate is lowered. Opposed tailgate sidewalls 12y and 12z (which may be formed integrally with inner wall 12a or outer wall 12b or which may be formed separately from either of walls 12a and 12b) may extend between the inner and outer walls to define (in conjunction with the inner and outer walls) a cavity 17 within the tailgate 12. In the lowered configuration, the tailgate 12 may be supported by cables 12s as shown in FIG. 2. Also, a support surface 12p (FIG. 2) of inner wall 12a may be structured so as to be coplanar or substantially coplanar with a support surface 14a of the cargo bed 14 when the tailgate 12 is in the lowered configuration. As used herein, the term "substantially" includes exactly the term it modifies and slight variations therefrom. Thus, the term "substantially coplanar" means exactly coplanar and slight variations therefrom. In the above example of the relationship between adjacent surfaces of the tailgate inner wall 12a and the cargo bed 14, variations can include mismatches within normal manufacturing and assembly tolerances, for example. In addition, the term "support surface" refers to a surface of a component (such as the tailgate inner wall 12a or a surface of the cargo bed 14) which is structured and/or positioned to bear a load exerted by, for example, cargo positioned in the cargo bed 14.

A cargo bed of the vehicle may be generally defined as a cargo-carrying area of a vehicle. In particular embodiments, the bed may be a conventional cargo bed (such as bed 14 bounded by a pair of spaced apart cargo bed side walls 10a, 10b and the tailgate 12 in the raised configuration, as shown in FIG. 1). In other particular embodiments, the bed may be an extended bed formed by placing the tailgate 12 in a lowered configuration and using an inner wall 12a of the tailgate as an extension of the conventional bed, as shown in FIG. 2. The terms "bed" and "cargo bed" as used herein may represent either of these arrangements.

An extension mechanism, generally designated 20, may be positioned within the cavity 17. The extension mechanism 20 may include an extension member 22. In particular embodiments, a cap 28 may be coupled to the tailgate 12 and may be operable to close an opening 17a in the tailgate leading into the cavity 17. The cap may, for example, be rotatably attached to the tailgate along a side thereof.

Figure 3A:
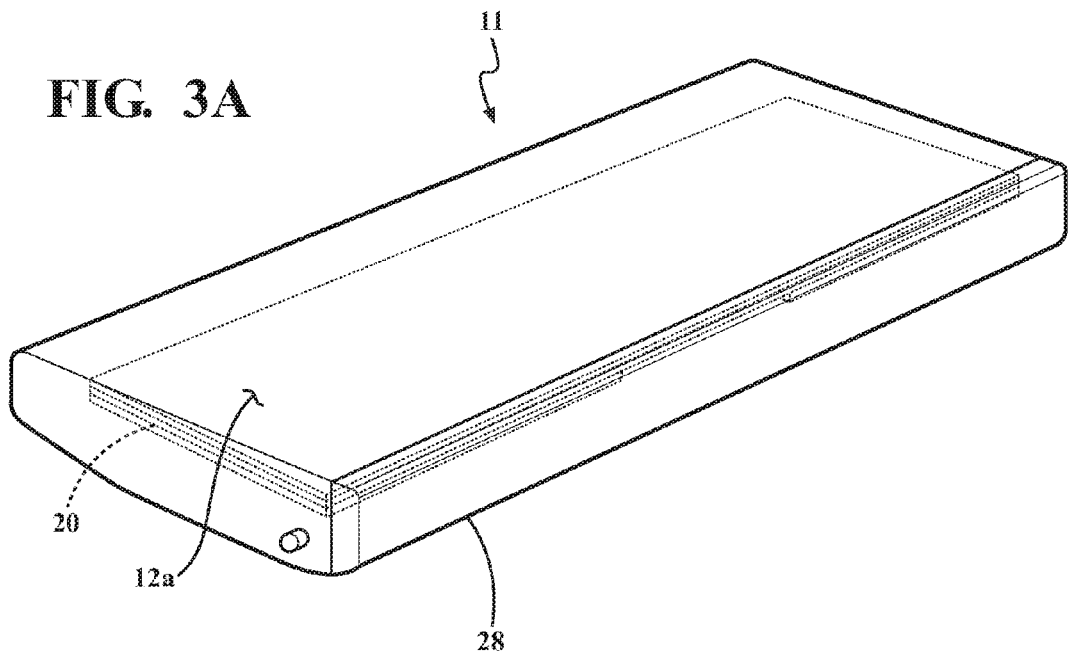
FIG. 3A is a perspective view of the tailgate of FIG. 2 showing an extension member of the cargo bed extension assembly in a stowed configuration.
Figure 3B:
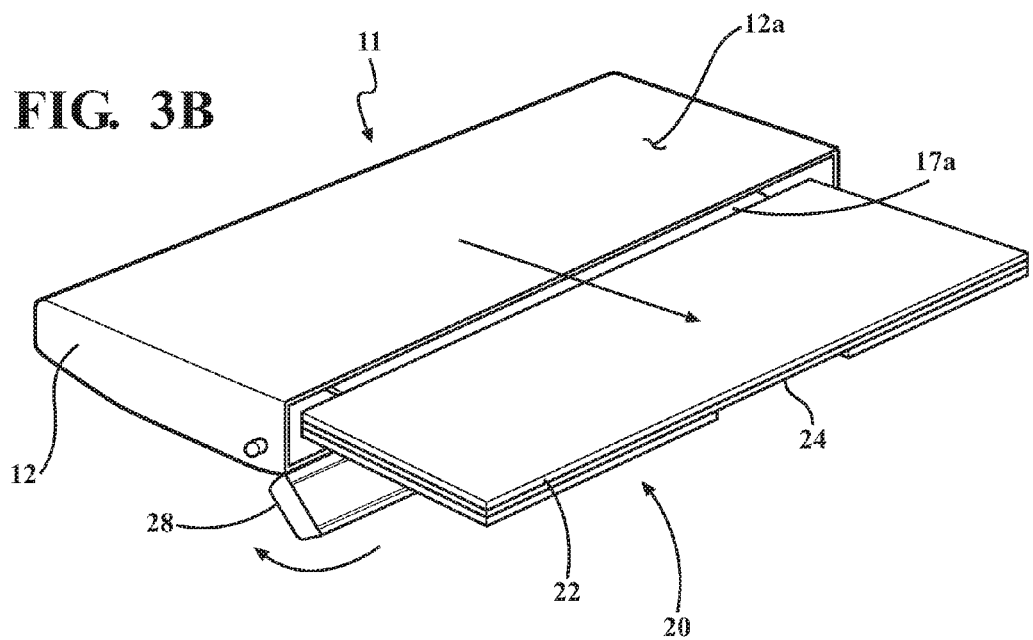
FIG. 3B is the perspective view of FIG. 3A showing the extension member in an extended configuration.

The extension member 22 may be configured for positioning along a rear-most portion of the tailgate 12 when the tailgate is lowered, to act as a wall or door for closing the rear portion of an extended bed. The extension member 22 may be coupled to the tailgate 12 so as to be movable between a stowed configuration inside the cavity 17 (as shown in FIG. 3A) and an extended configuration outside the cavity (as shown in FIG. 3B). The extension member 22 may also be coupled to the tailgate 12 so as to enable rotation of the extension member from the extended configuration shown in FIG. 3B to a raised configuration (shown in FIG. 3C) when the tailgate 12 is in its lowered configuration. For example, the extension member 22 may be rotatably mounted to a frame (not shown) which is structured to enable extraction of the frame (or a portion of the frame) from the cavity 17, thereby placing the extension member in the extended configuration. The extension member 22 may then be rotated into its raised configuration. Alternatively, the extension member may be mounted on rollers (not shown) which are seated in guides (not shown) positioned along sides of the cavity. Other suitable mounting structures may also be used which enable extraction of the extension member from the cavity 17 and subsequent rotation of the extension member 22 to its raised configuration. The extension member 22 may be maintained in the raised configuration by a suitable latch or locking mechanism (not shown), for example. In certain embodiments, the extension member 22 has a generally rigid structure and may be formed from any suitable material or materials (for example, metallic materials, polymers, etc.).

The extension mechanism 20 may also include a cover portion coupled to the extension member 22 so as to be movable between a stowed configuration and a deployed configuration in which the cover portion covers at least a portion of a cargo bed. In embodiments described herein, the cover portion is an element which is structured to serve as a tonneau cover capable of covering at least a portion of the cargo bed of a vehicle (for example, a pickup truck). Thus, the cover portion is an element which may be structured to conceal and/or cover cargo, and to protect cargo from the elements (such as sun and rain). The cover portion may be in the form of a single panel formed from a relatively hard or rigid element (for example, element 24 as shown in FIGS. 3A-3E and FIGS. 4A-4B), a group of multiple rigid panels connected to form an articulated unit (for example, element 124 as shown in FIGS. 5A-5B), or a flexible (or "soft") cover comprising a rollable sheet formed from a fabric, polymeric, or other suitable material (for example, element 224 as shown in FIGS. 7A-7E and 8A-8D). Alternatively, the cover portion may have any other suitable structure or composition. In particular embodiments, the cover portion is rotatably coupled to the extension member.

In some embodiments, when an extended bed is created by lowering the tailgate 12, the cover portion may be structured to enable (in its deployed configuration) coverage of at least a portion of the tailgate 12 extending between the extension member 22 and opposite side walls 10a, 10b of the cargo bed 14 when the tailgate 12 is in the lowered configuration and the extension member 22 is in the raised configuration. An example of one such cover embodiment is shown in FIGS. 3A-3E. FIG. 3A shows a tailgate 12 in a lowered configuration, with an embodiment 11 of the extension mechanism 20 stowed in a cavity 17 formed inside the tailgate. Cap 28 is positioned to cover the cavity opening 17a.

Figure 3C:
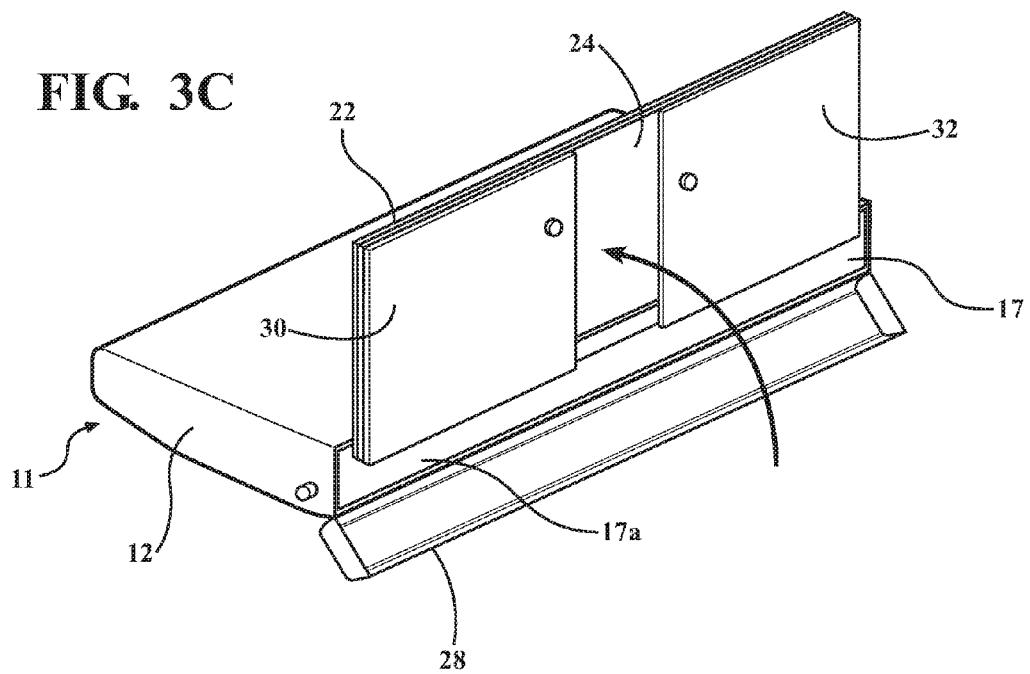
FIG. 3C is the perspective view of FIG. 3B showing rotation of the extension member from the extended configuration to a raised configuration.
Figure 3D:
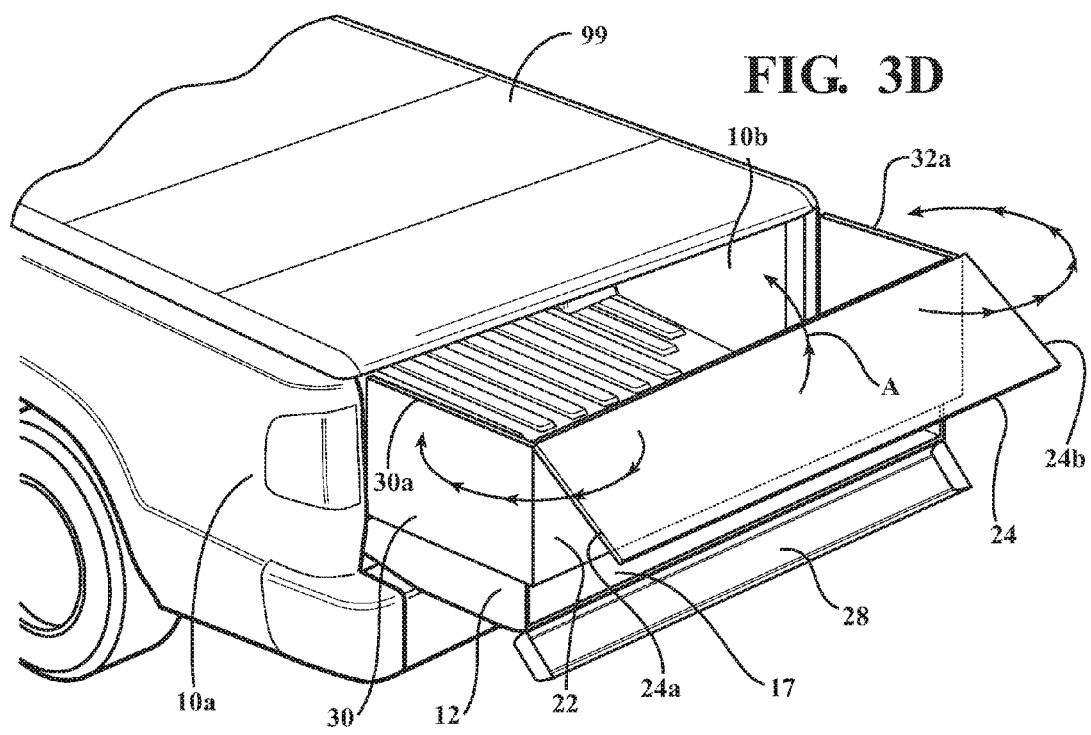
FIG. 3D is the perspective view of FIG. 3B showing rotation of embodiments of cargo bed extension assembly side panels toward the cargo bed sidewalls when the extension member is in its raised configuration.

FIG. 3B shows the cap 28 opened and the extension member 22 and cover portion (not shown) withdrawn from the tailgate interior, to an extended configuration of the extension member 22. FIG. 3C shows the extension member 22 rotated upwardly to a raised configuration. In particular embodiments, the raised configuration of the extension member 22 is a vertical or substantially vertical configuration. In this embodiment, the extension assembly 11 also includes first and second side panels 30 and 32 rotatably coupled to the extension member 22 so as to be movable between respective stowed configurations and deployed configurations. FIG. 3C shows the first side panel 30 in a stowed configuration, in which the panel 30 may rest flush against cover portion 24. To deploy the first side panel 30, the panel may be rotated approximately 270° until it contacts a first bed side wall 10a as shown in FIG. 3D. In its deployed configuration (shown in FIG. 3D), the first side panel 30 extends between the extension member 22 and first cargo bed side wall 10a when the extension member 22 is in the raised configuration. The first side panel 30 may be secured to the cargo bed sidewall 10a if desired, using a latch or other suitable mechanism.

Figure 3E:
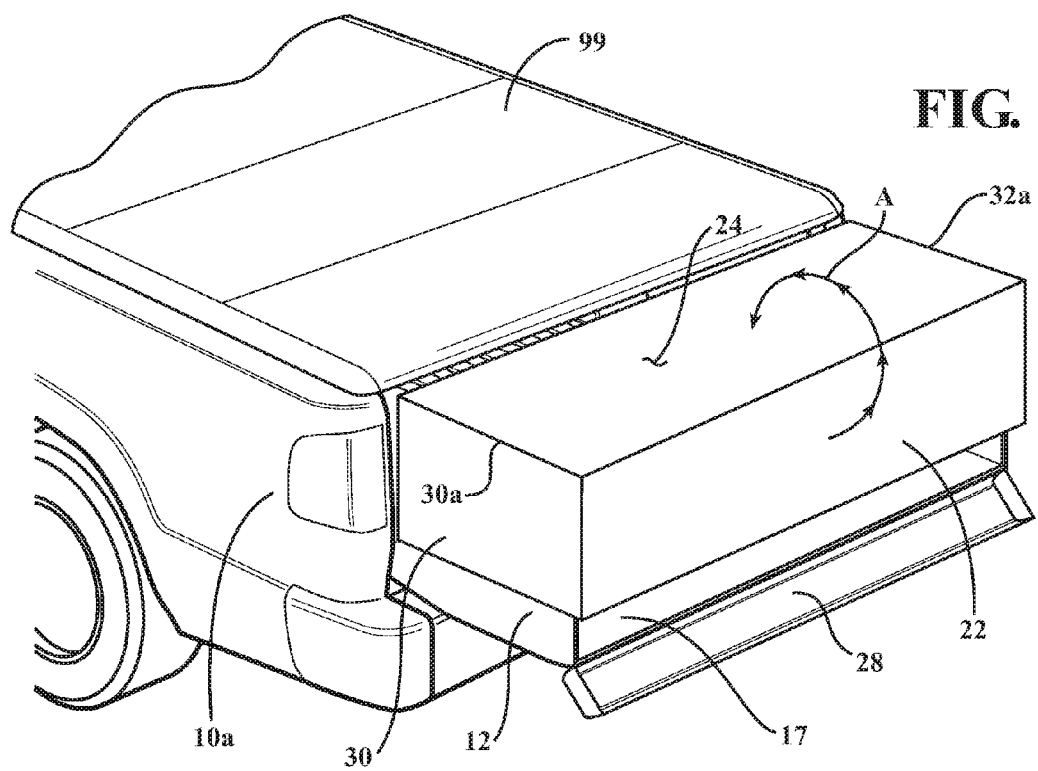
FIG. 3E is the perspective view of FIG. 3D showing rotation of an embodiment of a cover portion to cover an extended portion of the cargo bed.

FIG. 3C also shows the second panel 32 in its stowed configuration. To deploy the second panel 32, the panel may be rotated approximately 270° until it contacts a second cargo bed side wall 10b. In its deployed configuration (shown in FIG. 3D), the second panel 32 extends between the extension member 22 and second cargo bed side wall 10b when the extension member 22 is in the raised configuration. The second panel 32 may be secured to the cargo bed sidewall 10b if desired, using a latch or other suitable mechanism. In this embodiment it may be seen that, when the first and second side panels 30, 32 are in stowed configurations, the panels reside along a side of the extension member 22 that faces in a direction away from the cargo bed 14 when the extension member 22 is in the raised configuration. In this embodiment, cover portion 24 is rotatably or otherwise coupled to the extension member 22. FIG. 3C shows the cover in a stowed configuration, resting flush against or adjacent the extension member 22. Referring to FIG. 3D, when the side panels 30, 32 are rotated for deployment, the cover portion 24 may be rotated in direction "A" approximately 270° about an upper edge of the extension member 22 until it contacts upper edges 30a and 32a of the panels 30 and 32. In this configuration, the cover portion 24 covers at least a portion of the tailgate 12 extending between the extension member 22 and opposite side walls 10a, 10b of the cargo bed 14. In any of the embodiments described herein, an extended cover portion (such as cover portion 24 of FIGS. 3D and 3E) may contact or overlap a rear edge of a deployed existing tonneau cover so as to form a continuous cover covering both the regular and extended portions of the cargo bed. For example, FIGS. 3D and 3E show cover portion 24 contacting an existing cover 99 to form the continuous cover. In addition, in any of the embodiments described herein, a weather strip (not shown) such as a rubber strip may be applied along the upper edges of the side panels (such as panel upper edges 30a and 32a of FIG. 3D) to aid in preventing entry of moisture through the seams formed between the side panels and an associated cover portion (such as cover portion 24 of FIG. 3D). In addition, in any of the embodiments described herein, a weather strip or seal (not shown) may be attached along an edge of cover portion 24 which extends along or parallel to (and forms a seam with) a rear-most edge of the existing tonneau cover. These arrangements may provide a degree of protection against incursion of moisture into the seam formed by the extended cover portion 24 and the tonneau cover.

The hinges or other rotatable connections between side panels 30 and 32 and extension member 22 may be structured so as to permit lateral edges 24a and 24b of cover portion 24 to cover or overlap the edges 30a and 32a of the panels when the panels and cover portion are deployed as shown in FIG. 3E. For example, in the embodiment shown in FIGS. 3A-3E, the hinges or connections connecting the side panels 30 and 32 to the extension member 22 may be structured to enable lateral edges 24a and 24b of the cover portion 24 to overlap or extend past corresponding lateral edges of the extension member 22 when the cover portion is stowed. This enables the cover portion to cover or overlap the edges 30a and 32a of the panels when the panels and cover portion are deployed as shown in FIG. 3E.

Also, in the embodiment shown in FIGS. 3A-3E, the hinges or connections connecting the side panels 30 and 32 to the extension member 22 may be structured to enable the side panels 30 and 32 to be spaced apart from the extension member 22 when the panels are stowed, thereby providing space for the cover portion 24 to be positioned between the side panels 30, 32 and the extension member 22.

Figure 4A:
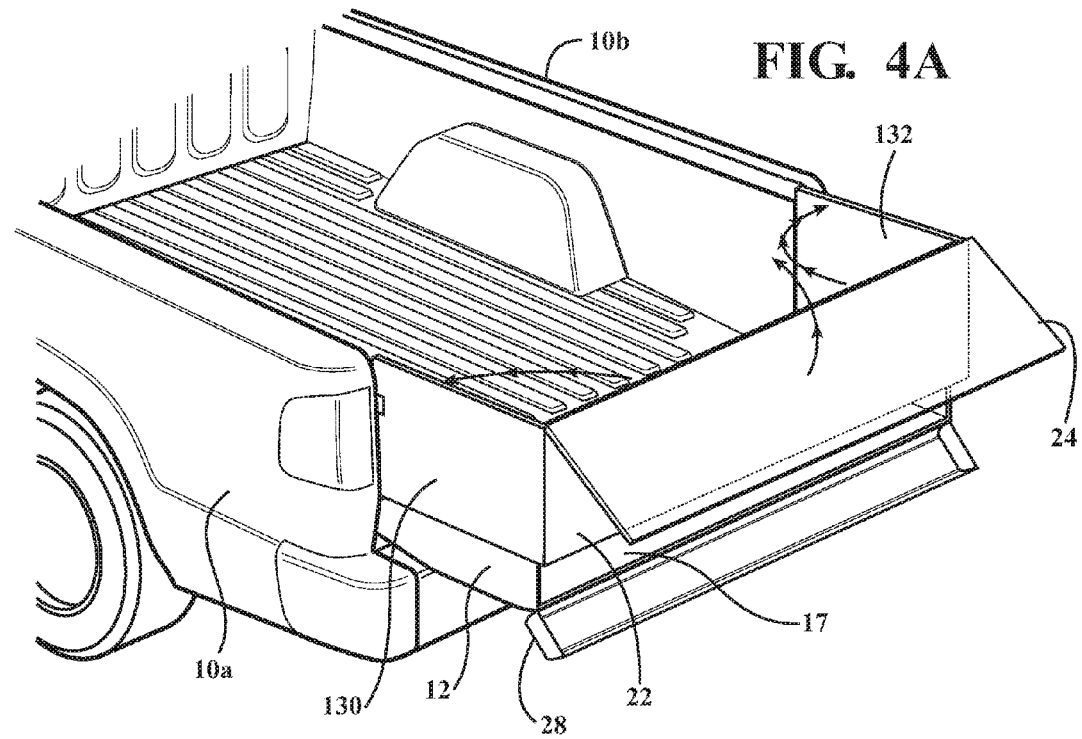
FIGS. 4A-4B are perspective views showing another embodiment of the cargo bed extension assembly, including alternative embodiments of extension assembly side panels rotatable toward the cargo bed sidewalls.
Figure 4B:
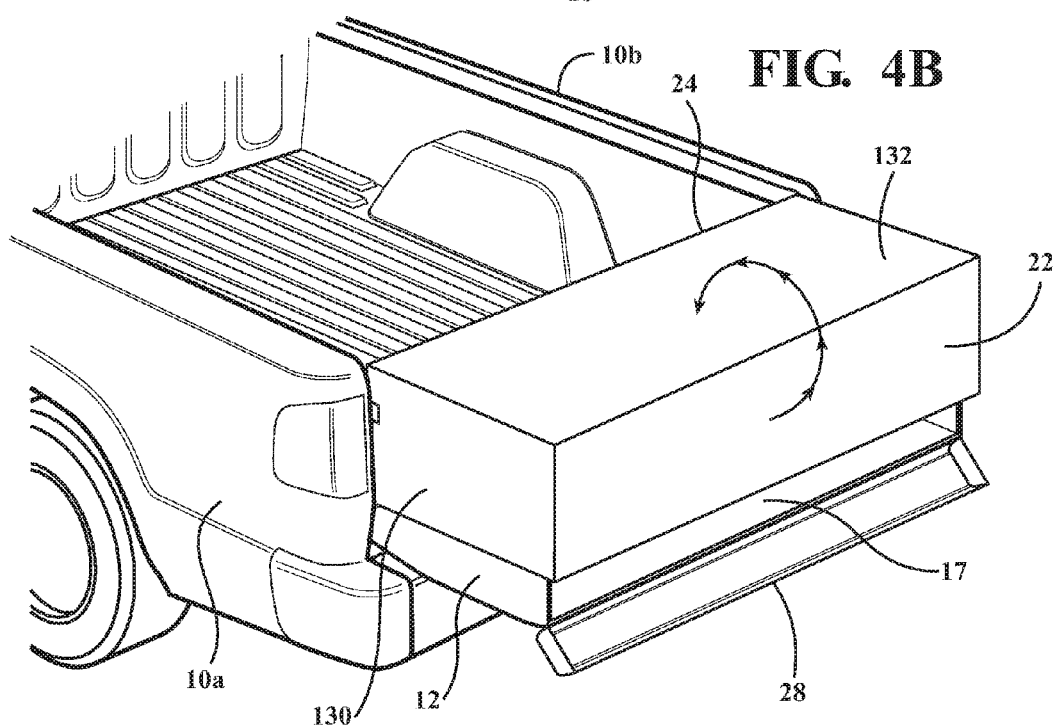
Figure 5A:
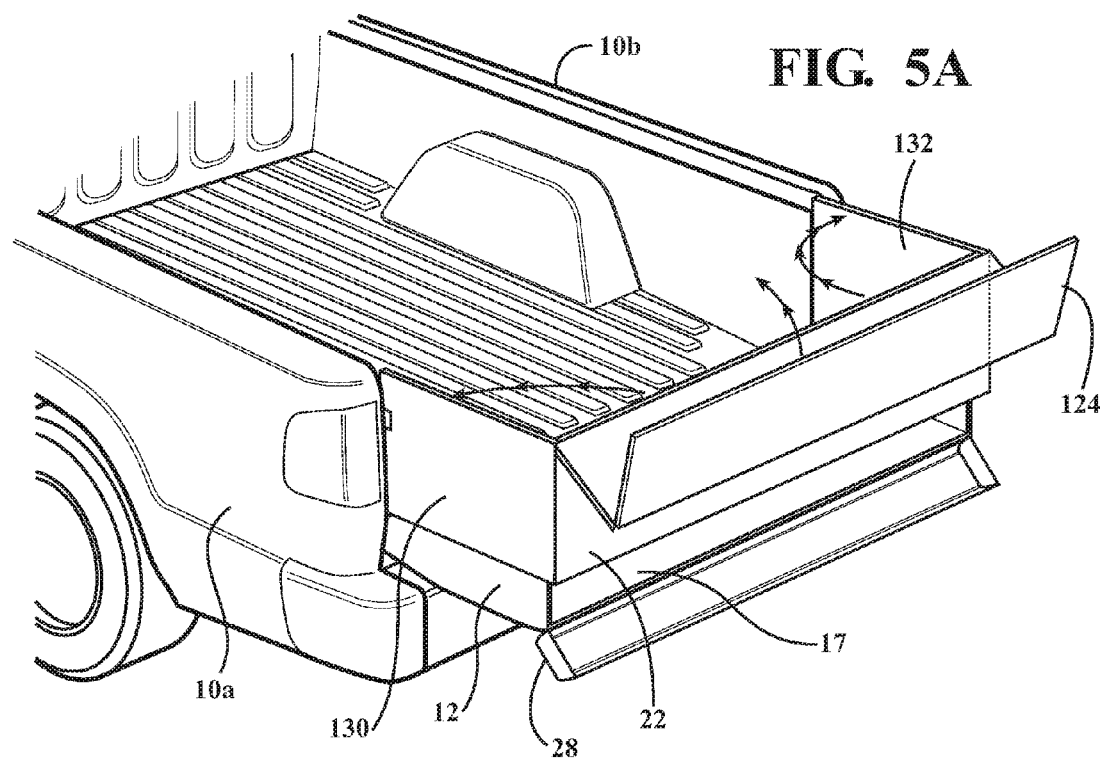
FIGS. 5A-5B are perspective views showing another embodiment of the cargo bed extension assembly, including an alternative embodiment of a cover portion.
Figure 5B:
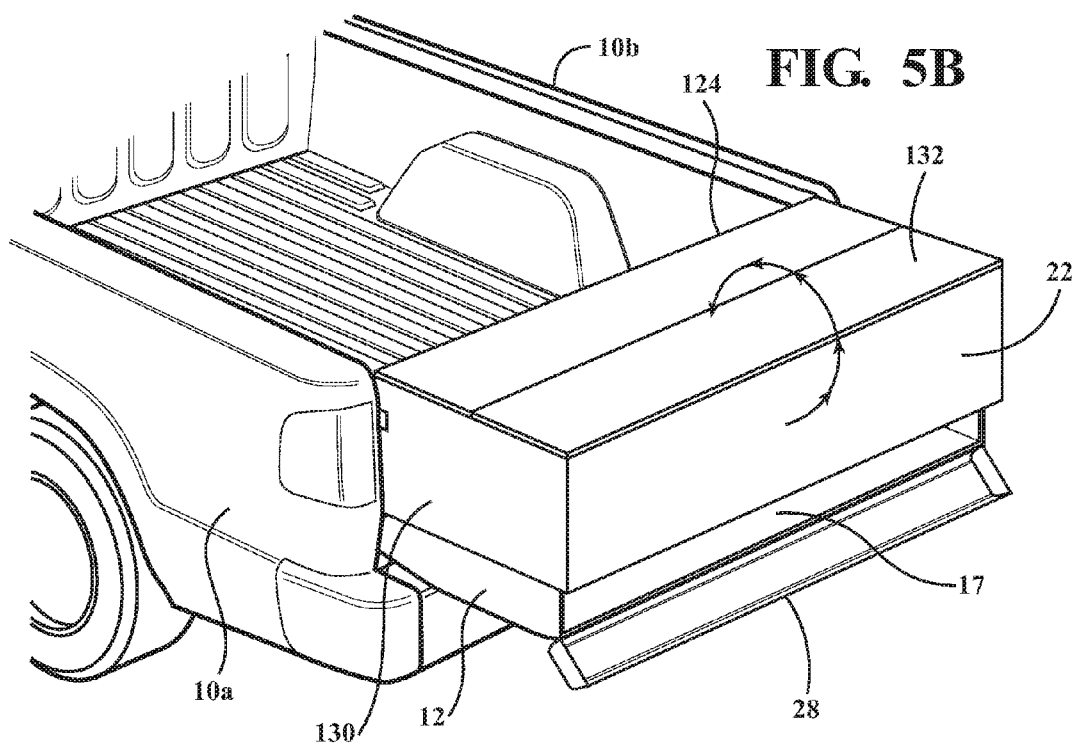

FIGS. 4A and 4B show an embodiment of the cargo bed extension assembly including first and second side panels 130 and 132 similar to the panels 30 and 32 shown in FIGS. 3A-3E. However, the panels 130 and 132 are configured such that, when the first and second side panels are in stowed configurations, the panels reside along a side of the extension member 22 that faces in a direction toward the cargo bed 14 when the extension member 22 is in its raised configuration. FIGS. 5A and 5B show an alternative embodiment in which the cover portion 124 is an articulated structure which may be folded for stowage against the extension member 22, as previously described.

Referring to FIGS. 9A and 9B, in an alternative embodiment, side panels 430 and 432 similar to the side panels 30 and 32 shown in FIGS. 3A-3E are stowed between the extension member 22 and the cover portion 424. The hinges or connections connecting the cover portion 424 to the extension member 22 may be structured to enable the cover portion 424 to be spaced apart from the extension member 22 when the cover member is stowed, thereby providing space for the side panels 430 and 432 to be positioned between the panels cover portion 424 and the extension member 22.

Figure 10A:
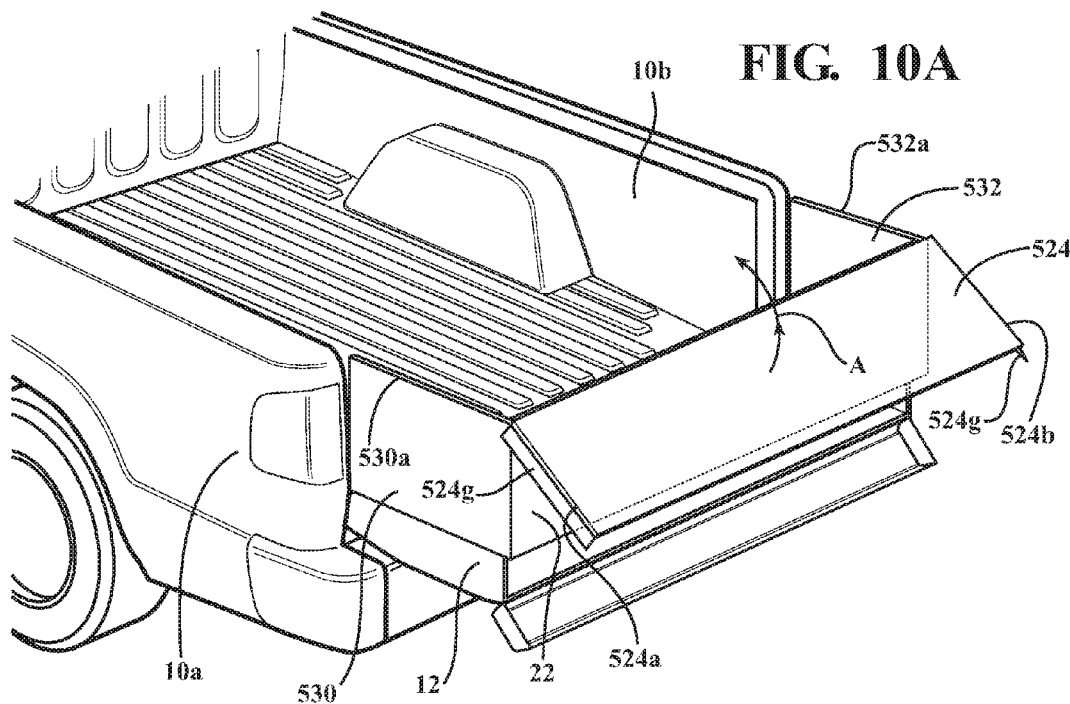
FIGS. 10A and 10B are perspective views of a cargo bed extension assembly which incorporates flexible sealing members structured for preventing moisture from entering a covered cargo bed.
Figure 10B:
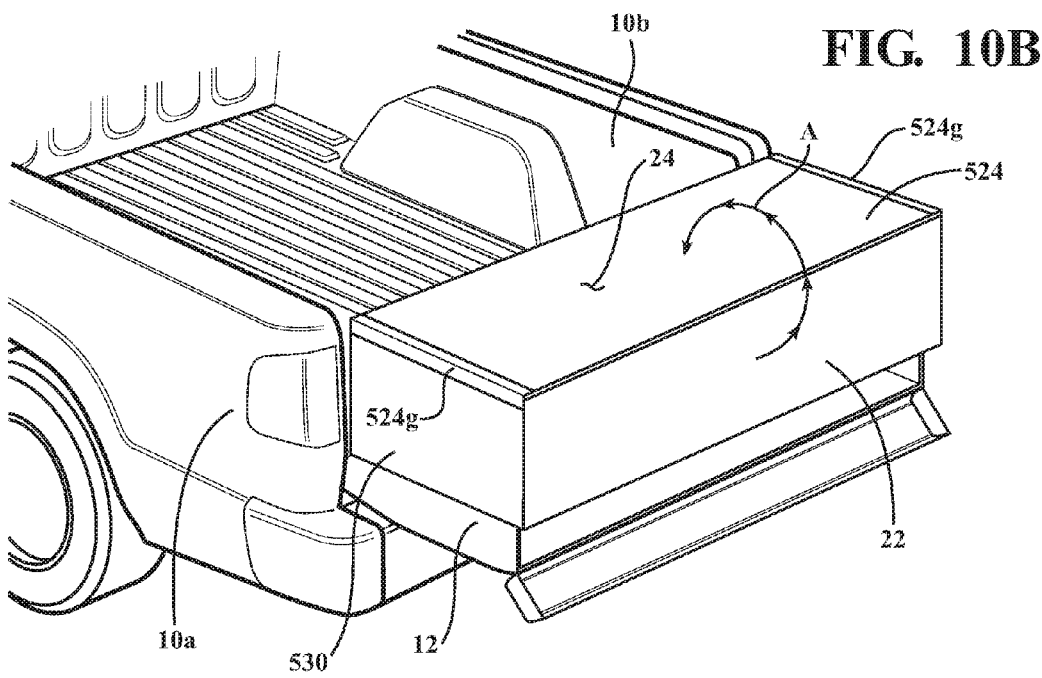

Referring to FIGS. 10A-10B, in a particular embodiment, lateral edges 524a and 524b of the cover portion 524 may each have a flexible sealing member attached thereto. In one embodiment, the sealing member is in the form of a fabric strip 524g including attachment means (such as hook and loop fasteners) positioned along the strip. Complementary attachment means (not shown) are positioned proximate the edges 530a and 532a of the panels 530 and 532. When the cover portion 524 and the panels 530 and 532 are deployed, the sealing member 524g along each lateral edge of the cover portion 524 may be folded to overlap the seam between the cover portion and the associated panel. The attachment means along each sealing member 524g may then engage the attachment means on the associated panel to secure the sealing member 524g over the seam.

Figure 6:
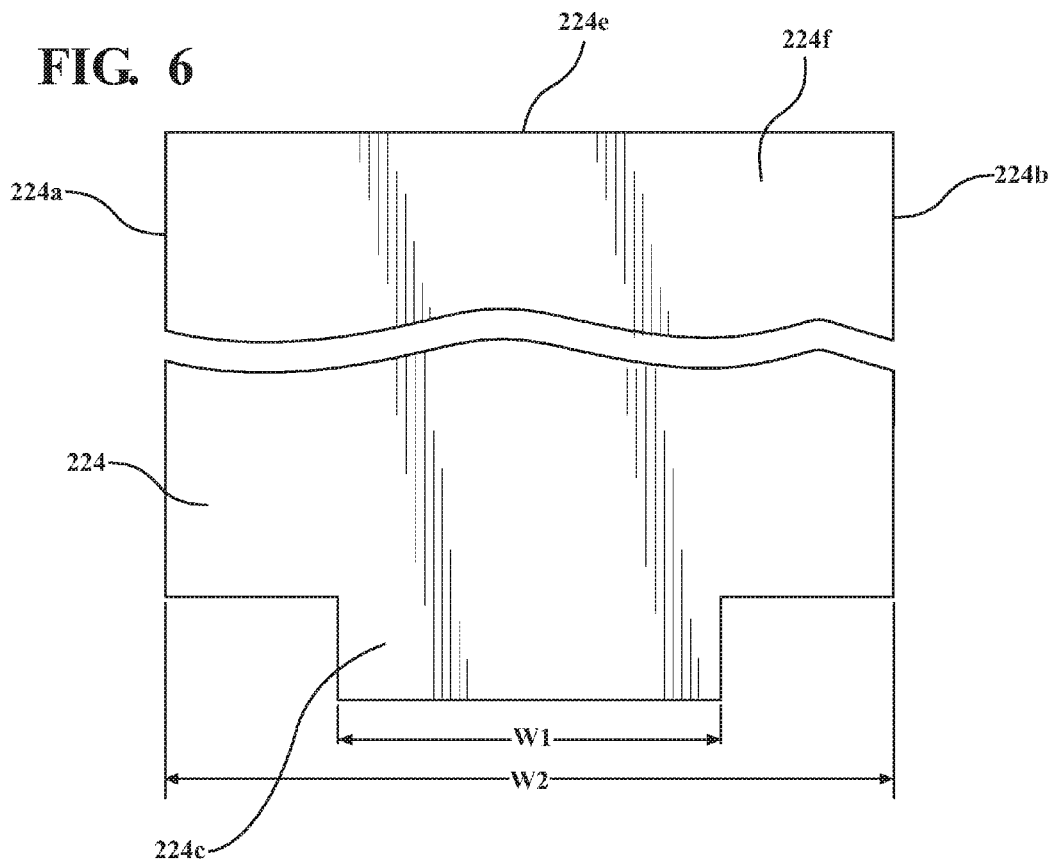
FIG. 6 is a plan view of one embodiment of a rollable and foldable cover portion structured to be stowable within a cavity in the tailgate, and to be deployable to cover the entire cargo bed, including an extended portion of the bed.
Figure 7A:
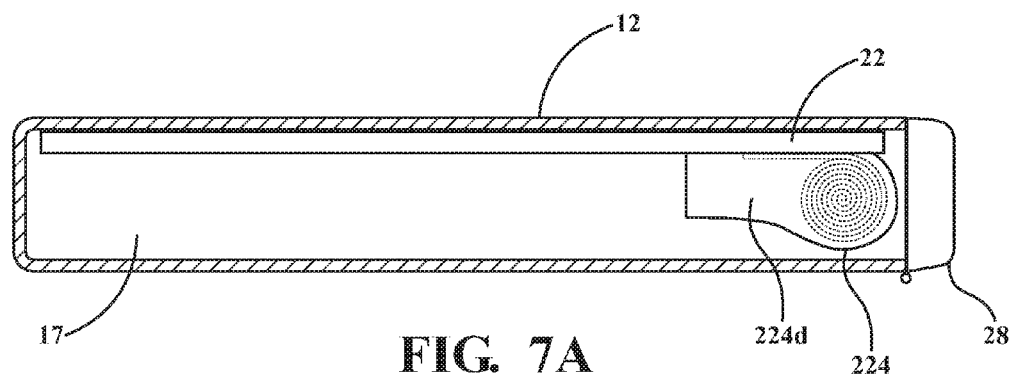
FIG. 7A is a cross-sectional side view of one embodiment of a cargo bed extension assembly incorporating a rollable and foldable cover portion as shown in FIG. 6.
Figure 7B:
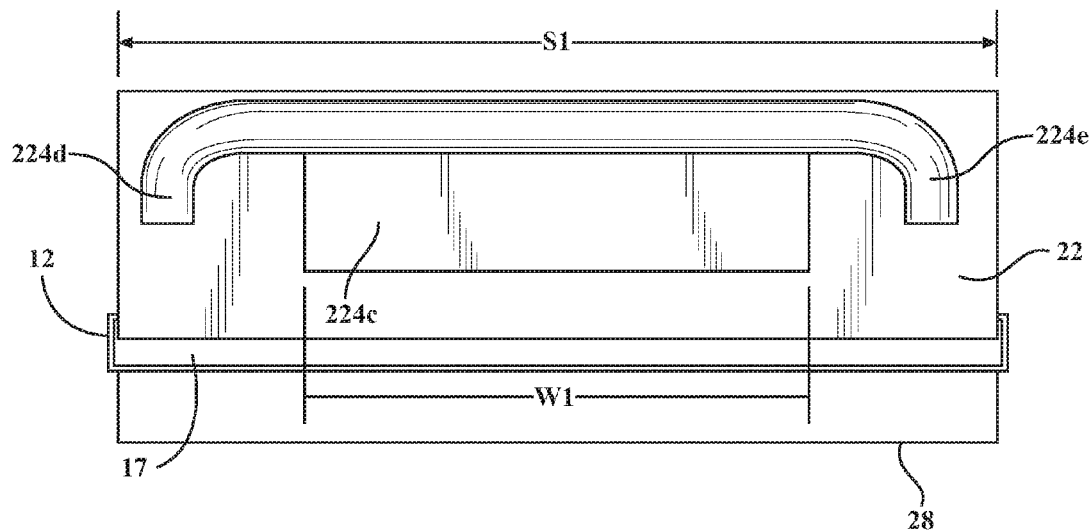
FIG. 7B is a rear view of the cargo bed extension assembly of FIG. 7A, showing the extension member in a raised configuration and showing a rollable and foldable cover portion in a rolled-up and folded condition.
Figure 7C:
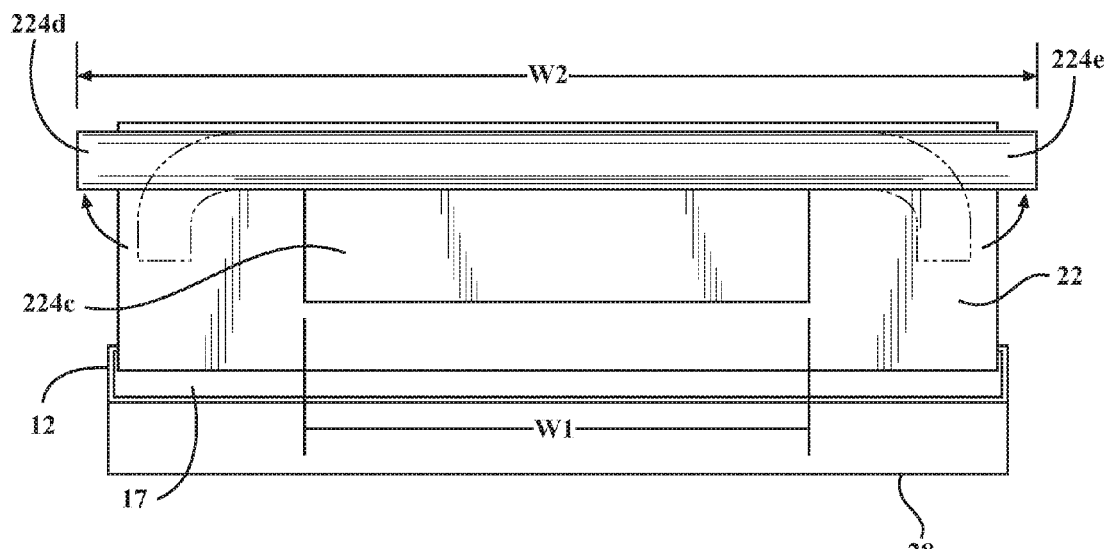
FIG. 7C is the rear view of FIG. 7B, showing the cover portion in a rolled-up and unfolded condition.

In some embodiments, when an extended cargo bed is employed, the cover portion may be structured to enable (in its deployed configuration) coverage of the entire cargo bed 14 when the tailgate 12 is in the lowered configuration and the extension member 22 is in the raised configuration. FIG. 6 shows a plan view of one embodiment of a cover portion 224 structured to be stowable within the tailgate cavity 17 and to be deployable to cover the entire bed 14, including the extended portion of the bed. In the embodiment shown in FIG. 6, a first section 224c of cover portion 224 which is attached to the extension member 22 has a first width dimension W1. The cover portion also has a second section 224f with a second width dimension W2 larger than the first width dimension. The width dimensions W1 and W2 extend in directions perpendicular to a plane including a fore-aft axis X2 (seen in FIG. 2) of the vehicle when the cover portion is mounted in the tailgate. Width W1 is also dimensioned so as to be smaller than a width S1 (FIG. 7B) of the extension member 22 to which the cover portion 224 is to be attached. The cover portion embodiment shown in FIG. 6 is shown in an unrolled and unfolded condition, while FIGS. 7A and 7B show the cover portion embodiment in a rolled-up and folded condition (i.e., with ends 224d, 224e of the rolled up cover portion folded as described herein to fit inside the tailgate). FIG. 7C shows the cover portion embodiment in a rolled-up but unfolded condition.

Width W2 is dimensioned so as to be wide enough to enable the cover portion 224 to extend over a width of the cargo bed 14 with opposite side edges 224a and 224b resting on top of cargo bed sidewalls 10a and 10b, respectively, when the cover portion 224 is unfolded and deployed. In this embodiment, the cover portion 224 may be a soft cover portion which is rollable and foldable into a configuration positionable within the tailgate cavity 17, in the manner described below.

FIG. 7A is a cross-sectional side view of one embodiment of an extension mechanism incorporating a rollable cover as shown in FIG. 6. The extension member 22 is shown in a stowed configuration. The cover portion 224 is also shown rolled up and folded and pressed against the extension member 22 for stowage. In addition, the relatively wider part 224f of the cover portion 224 (which has a width W2) has end portions 224d and 224e which may be folded in a direction toward the bed (when the extension member 22 is stowed). Alternatively, the end portions 224d and 224e may be folded in a direction away from the bed, or in any other suitable direction.

Figure 7D:
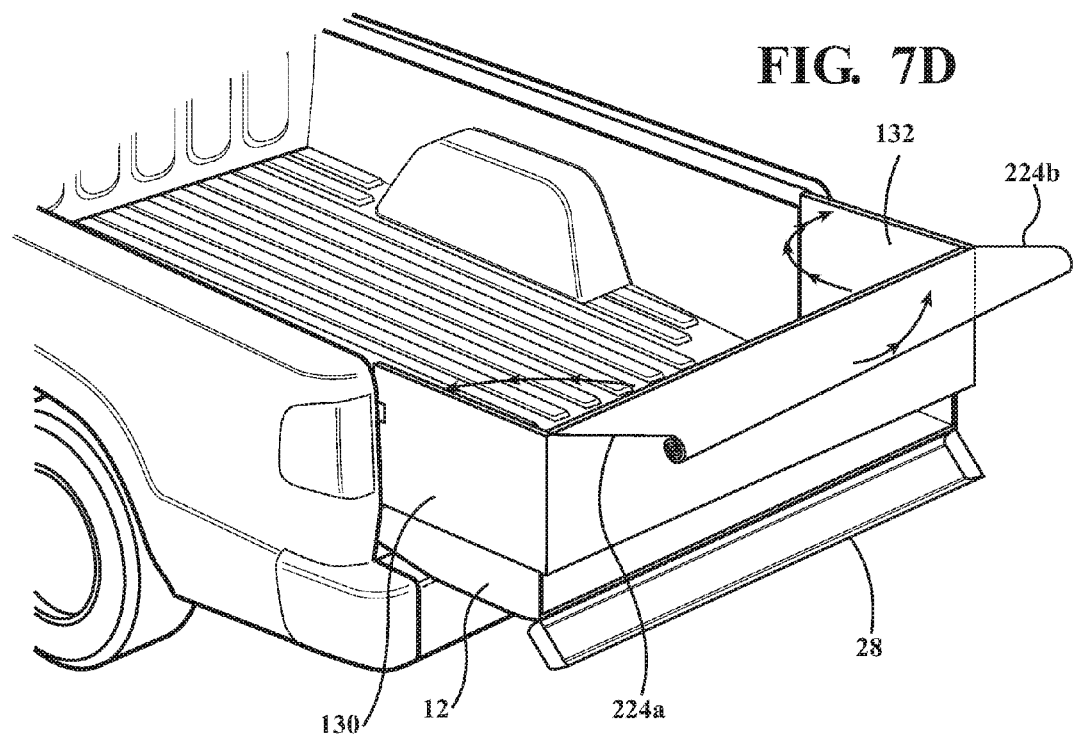
FIG. 7D is a perspective view of the cargo bed extension assembly of FIGS. 7A-7C prior to unfolding of the cover portion to cover the cargo bed.
Figure 7E:
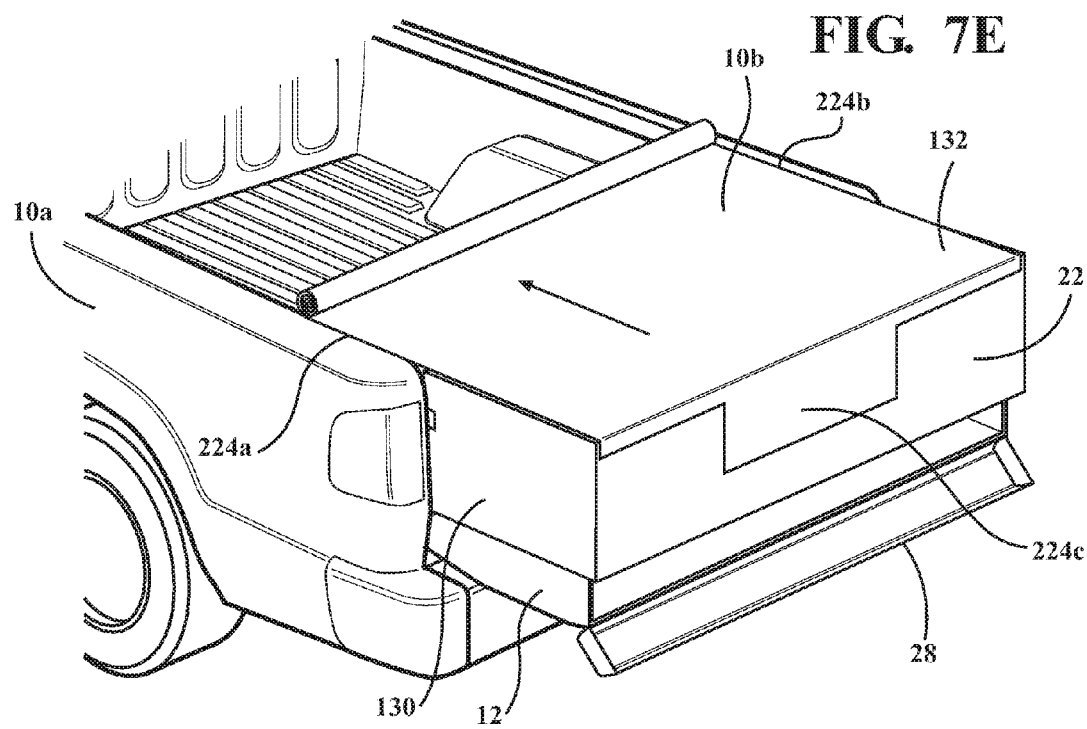
FIG. 7E is the perspective view of FIG. 7D showing unfolding of the cover portion to cover the cargo bed.

FIGS. 7B and 7C are rear views of the extension member 22 in a deployed configuration. Referring to FIG. 7B, to deploy the extension member 22, cap 28 is operated to open cavity 17. Extension member 22 is then extracted from the cavity 17 to its extended configuration and rotated to its deployed configuration, as previously described. FIG. 7B also shows the folded configurations of the folded cover portion end portions 224d and 224e. Referring to FIG. 7C, when it is desired to deploy the cover portion 224, the folded end portions 224d and 224e may be unfolded, so that the full width W2 of the cover portion extends across a width of the vehicle. Referring to FIGS. 7D and 7E, the cover portion 224 may then be unfolded in a forward direction of the vehicle, to cover the bed 14. FIGS. 7D and 7E also show an embodiment including side panels 130 and 132 in an arrangement similar to that shown in FIGS. 4A and 4B. FIGS. 7A-7E show an embodiment where the cover portion 224 is attached to a side of the extension member 22 facing away from the cargo bed 14. In this embodiment, the cover portion 224 will extend over the upper edge of the deployed extension member when deployed. In alternative embodiments, the cover portion may be secured to a side of the extension member 22 facing the bed. When the cover portion is unrolled as shown in FIG. 7E, opposite edges 224a and 224b of the cover portion may be secured to associated cargo bed sidewalls 10a and 10b using magnets, Velcro® strips, snaps, fasteners, or any other suitable method or methods. In addition, a free end 224e (FIG. 6) of the cover portion 224 may be secured to the vehicle cab (not shown) or to a portion of the vehicle proximate the cab to provide full coverage of the cargo bed 14.

Figures 8A, 8B, 8C, 8D:
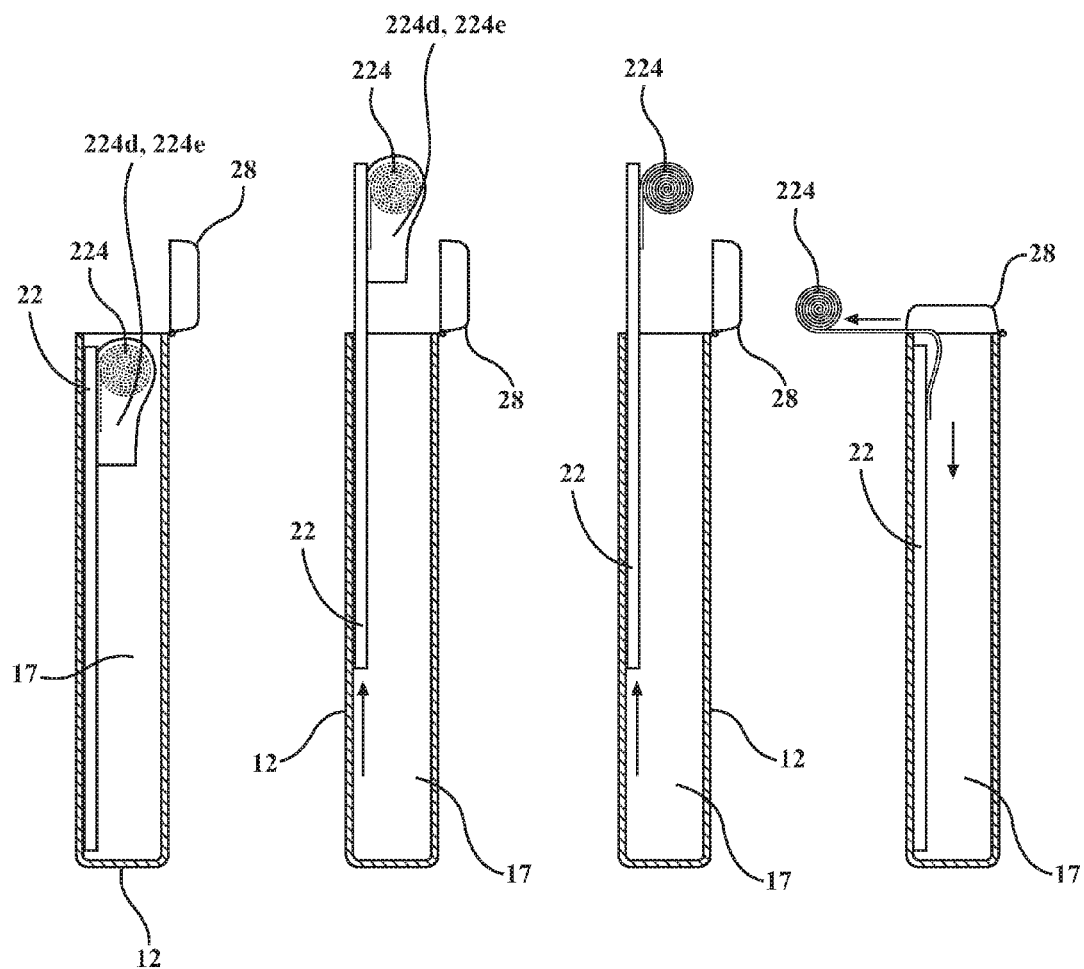
FIGS. 8A-8D show schematic cross-sectional side views of an alternative embodiment of a tailgate and associated cover portion, in which the cover portion is structured to cover an entire cargo bed when the tailgate is in a raised configuration, and showing an extension member to which the cover portion is attached is in a stowed configuration.

In some embodiments, when a conventional (i.e., non-extended) bed is employed, the cover portion may be structured to enable (in its deployed configuration) coverage of the entire bed when the tailgate 12 is in the raised configuration and the extension member is in the stowed configuration. FIGS. 8A-8D show schematic cross-sectional side views of one embodiment of such a cover member configuration. In FIG. 8A, the tailgate 12 is raised and the extension member 22 is stowed inside the tailgate. The cover portion 224 may have the same configuration as shown in FIG. 6 and may be folded within the tailgate as shown in FIG. 7B (i.e., the cover portion 224 of FIGS. 8A-8D may be rolled-up and have folded end portions similar to end portions 224d and 224e of FIG. 7B).

In FIG. 8B, with the tailgate 12 still raised and secured in the raised configuration, the extension member 22 may be extracted from the cavity 17 by lifting the extension member 22 vertically out of the cavity. The extension member 22 may be lifted far enough out of the cavity so that the cover portion folded end portions 224d and 224e are above the cavity opening 17a. The end portions 224d and 224e may then be unfolded as shown in FIG. 7C and the cover portion unrolled as shown in FIG. 8D toward the front of the vehicle to cover the cargo bed. The extension member 22 may be released to drop back into the cavity 17. If desired, the tailgate may be provided with drain holes (not shown) to enable moisture entering the cavity 17 during use of the cover to drain from the tailgate interior. Alternatively, cap 28 may be configured so as to be closable over the opening 17a so as to prevent moisture from entering the cavity when the cover portion 224 is deployed.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

In the detailed description, reference is made to the accompanying figures, which form a part hereof. In the figures, similar symbols and reference characters typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, reference should be made to the following claims, rather than to the foregoing specification, as indicating the scope of the invention.

What is claimed is:

1. A cargo bed extension assembly comprising:
a tailgate structured to be movable between a raised configuration and a lowered configuration, the tailgate including a cavity formed therein; and
an extension mechanism positioned within in the cavity, the extension mechanism including:
an extension member coupled to the tailgate so as to be movable between a stowed configuration and an extended configuration, and so as to enable rotation of the extension member from the extended configuration to a raised configuration; and
a cover portion coupled to the extension member so as to be movable between a stowed configuration and a deployed configuration in which the cover portion covers at least a portion of a cargo bed, wherein the cover portion is an articulated structure formed from a plurality of connected panels.

2. A cargo bed extension assembly comprising:
a tailgate structured to be movable between a raised configuration and a lowered configuration, the tailgate including a cavity formed therein; and
an extension mechanism positioned within in the cavity, the extension mechanism including:
an extension member coupled to the tailgate so as to be movable between a stowed configuration and an extended configuration, and so as to enable rotation of the extension member from the extended configuration to a raised configuration, and a cover portion coupled to the extension member so as to be movable between a stowed configuration and a deployed configuration in which the cover portion covers at least a portion of a cargo bed,
wherein the cover portion is structured to enable the cover portion to cover at least a portion of the tailgate extending between the extension member and opposite side walls of the cargo bed when the tailgate is in the lowered configuration, the extension member is in the raised configuration, and the cover portion is in the deployed configuration.

3. A cargo bed extension assembly comprising:
a tailgate structured to be movable between a raised configuration and a lowered configuration, the tailgate including a cavity formed therein; and
an extension mechanism positioned within in the cavity, the extension mechanism including:
an extension member coupled to the tailgate so as to be movable between a stowed configuration and an extended configuration, and so as to enable rotation of the extension member from the extended configuration to a raised configuration, and a cover portion coupled to the extension member so as to be movable between a stowed configuration and a deployed configuration in which the cover portion covers at least a portion of a cargo bed,
wherein the cover portion is structured to enable the cover portion to cover an entire cargo bed when the tailgate is in the lowered configuration, the extension member is in the raised configuration, and the cover portion is in the deployed configuration.

4. A cargo bed extension assembly comprising:
a tailgate structured to be movable between a raised configuration and a lowered configuration, the tailgate including a cavity formed therein; and
an extension mechanism positioned within in the cavity, the extension mechanism including:
an extension member coupled to the tailgate so as to be movable between a stowed configuration and an extended configuration, and so as to enable rotation of the extension member from the extended configuration to a raised configuration, and a cover portion coupled to the extension member so as to be movable between a stowed configuration and a deployed configuration in which the cover portion covers at least a portion of a cargo bed,
wherein the cover portion is structured to enable the cover portion to cover an entire cargo bed when the tailgate is in the raised configuration, the extension member is in the stowed configuration, and the cover portion is in the deployed configuration.

5. A cargo bed extension assembly comprising:
a tailgate structured to be movable between a raised configuration and a lowered configuration, the tailgate including a cavity formed therein; and
an extension mechanism positioned within in the cavity, the extension mechanism including:
an extension member coupled to the tailgate so as to be movable between a stowed configuration and an extended configuration, and so as to enable rotation of the extension member from the extended configuration to a raised configuration, and a cover portion coupled to the extension member so as to be movable between a stowed configuration and a deployed configuration in which the cover portion covers at least a portion of a cargo bed, wherein the cover portion is a soft cover portion which is rollable and/or foldable into a configuration positionable within the cavity.

6. The cargo bed extension assembly of claim 1 wherein the cover portion is coupled to the extension member so as to be positionable along a side of the extension member facing in a direction away from the cargo bed when the tailgate is in a lowered configuration and the extension member is in a raised configuration.

7. A cargo bed extension assembly comprising:
a tailgate structured to be movable between a raised configuration and a lowered configuration, the tailgate including a cavity formed therein; and
an extension mechanism positioned within in the cavity, the extension mechanism including:
an extension member coupled to the tailgate so as to be movable between a stowed configuration and an extended configuration, and so as to enable rotation of the extension member from the extended configuration to a raised configuration, and a cover portion coupled to the extension member so as to be movable between a stowed configuration and a deployed configuration in which the cover portion covers at least a portion of a cargo bed, wherein a first section of the cover portion has a first width and a second section of the cover portion adjacent the first section has a second width greater than the first width.

8. The cargo bed extension assembly of claim 7 wherein the first section of the cover portion is attached to a side of the extension member which is structured to face in a direction away from the cargo bed when the tailgate is in a lowered configuration and the extension member is in the raised configuration.

9. The cargo bed extension assembly of claim 3 wherein the cover portion is rotatably coupled to the extension member.

10. A cargo bed extension assembly comprising:
a tailgate structured to be movable between a raised configuration and a lowered configuration, the tailgate including a cavity formed therein; and
an extension mechanism positioned within in the cavity, the extension mechanism including:
- an extension member coupled to the tailgate so as to be movable between a stowed configuration and an extended configuration, and so as to enable rotation of the extension member from the extended configuration to a raised configuration;
- a cover portion coupled to the extension member so as to be movable between a stowed configuration and a deployed configuration in which the cover portion covers at least a portion of a cargo bed;
- a first side panel rotatably coupled to the extension member so as to be movable between a stowed configuration and a deployed configuration in which the first side panel extends between the extension member and a first cargo bed side wall when the extension member is in the raised configuration; and
- a second side panel rotatably coupled to the extension member so as to be movable between a stowed configuration and a deployed configuration in which the second side panel extends between the extension member and a second cargo bed side wall opposite the first cargo bed side wall when the extension member is in the raised configuration.

11. The cargo bed extension assembly of claim 10 wherein the first side panel is structured to be securable to the first cargo bed side wall to maintain the first side panel in a deployed configuration, and the second side panel is structured to be securable to the second cargo bed side wall to maintain the second side panel in a deployed configuration.

12. The cargo bed extension assembly of claim 10 wherein the assembly is structured such that, when the first and second side panels are in stowed configurations, the first and second side panels reside along a side of the extension member that faces in a direction toward the cargo bed when the extension member is in the raised configuration.

13. The cargo bed extension assembly of claim 10 wherein the assembly is structured such that, when the first and second side panels are in stowed configurations, the first and second side panels reside along a side of the extension member that faces in a direction away from the cargo bed when the extension member is in the raised configuration.

14. The cargo bed extension assembly of claim 13 wherein the cover portion is structured to reside between the extension member and the first and second side panels when the first and second side panels and the cover portion are in stowed configurations.

15. The cargo bed extension assembly of claim 13 wherein the first and second side panels are structured to reside between the extension member and the cover portion when the cover portion and the first and second side panels are in stowed configurations.

16. A cargo bed extension mechanism for a vehicle tailgate, the cargo bed extension mechanism comprising:
- an extension member structured for coupling to the tailgate so as to be movable to a raised configuration when the tailgate is in a lowered configuration; and
- a cover portion coupled to the extension member and structured to be movable between a stowed configuration and a deployed configuration in which the cover portion covers the tailgate when the tailgate is in the lowered configuration and the extension member is in the raised configuration.

17. The cargo bed extension mechanism of claim 16 further comprising a first side panel rotatably coupled to the extension member so as to be movable between a stowed configuration and a deployed configuration, a second side panel rotatably coupled to the extension member so as to be movable between a stowed configuration and a deployed configuration, and wherein the cover portion is positioned between the extension member and the first and second side panels when the first and second side panels are in stowed configurations.

18. The cargo bed extension assembly of claim 4, wherein the cover portion is a soft cover portion which is rollable into a configuration positionable within the cavity, and wherein the cover portion is structured to be movable between a stowed configuration inside the cavity and the deployed configuration.

19. The cargo bed extension assembly of claim 18, wherein the tailgate includes an inner wall and an outer wall, wherein the cavity is formed between the inner and outer walls.

20. The cargo bed extension assembly of claim 3, wherein the cover portion is a soft cover portion which is rollable into a configuration positionable within the cavity, and wherein the cover portion is structured to be movable between a stowed configuration inside the cavity and the deployed configuration.

21. The cargo bed extension assembly of claim 20, wherein the tailgate includes an inner wall and an outer wall, wherein the cavity is formed between the inner and outer walls.

* * * * *